(12) United States Patent
Sundström et al.

(10) Patent No.: US 9,591,563 B2
(45) Date of Patent: Mar. 7, 2017

(54) POWER EFFICIENT DATA TRANSMISSION

(75) Inventors: Lars Sundström, Lund (SE); Stefan Andersson, Lund (SE); Bengt Lindoff, Bjärred (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 568 days.

(21) Appl. No.: 12/633,848

(22) Filed: Dec. 9, 2009

(65) Prior Publication Data

US 2011/0003609 A1    Jan. 6, 2011

Related U.S. Application Data

(60) Provisional application No. 61/222,240, filed on Jul. 1, 2009.

(51) Int. Cl.
*H04B 1/00* (2006.01)
*H04B 15/00* (2006.01)
(Continued)

(52) U.S. Cl.
CPC ......... *H04W 52/0206* (2013.01); *Y02B 60/50* (2013.01)

(58) Field of Classification Search
CPC ...... Y02B 60/50; H04W 28/18; H04W 28/20; H04W 28/22; H04W 16/02; H04W 52/0258; H04W 52/40; H04W 72/042; H04W 72/0406; H04W 72/0413; H04W 72/0453; H04W 72/0473; H04W 72/08; H04W 84/12; H04W 88/06; H04W 16/12; H04W 28/14;
(Continued)

(56) References Cited

U.S. PATENT DOCUMENTS 6,631,124 B1 * 10/2003 Koorapaty et al. ........... 370/337
6,804,214 B1 * 10/2004 Lundh ................... H04W 16/00
                                                                 370/335
(Continued)

FOREIGN PATENT DOCUMENTS

EP    0907296 A1    4/1999
EP    1473885 A1    11/2004
(Continued)

*Primary Examiner* — Yuwen Pan
*Assistant Examiner* — Paul P Tran
(74) *Attorney, Agent, or Firm* — Coats & Bennett, PLLC

(57) ABSTRACT

Teachings herein schedule a data transmission in a variable bandwidth wireless communication system based on the power efficiency of a mobile node. One or more processing circuits, of the mobile node or a network node, determine the value of a control setting that defines a power efficiency configuration of the mobile node. In one embodiment, for example, the power efficiency configuration indicates the mobile node is configured to operate at the maximum power efficiency attainable without the data rate of the data transmission falling below a minimum data rate required by a quality of service. Regardless, the one or more processing circuits select from different possible bandwidths of the data transmission a bandwidth that supports a given data rate and that, according to a power efficiency model that models power efficiency of the mobile node for the different possible bandwidths, yields a power efficiency comporting with the power efficiency configuration.

29 Claims, 5 Drawing Sheets

(51) Int. Cl.
  *H04W 72/00* (2009.01)
  *H04B 7/00* (2006.01)
  *H04M 1/00* (2006.01)
  *H04B 1/38* (2015.01)
  *H04J 11/00* (2006.01)
  *H04W 4/00* (2009.01)
  *H04B 7/216* (2006.01)
  *H04L 5/16* (2006.01)
  *H04K 1/10* (2006.01)
  *H04L 27/28* (2006.01)
  *H04W 52/02* (2009.01)

(58) Field of Classification Search
  CPC ... H04W 52/02; H04W 52/146; H04W 52/18;
    H04W 52/20; H04W 52/244; H04W
    72/04; H04W 72/10; H04W 72/1278;
    H04W 72/1284; H04L 1/0002; H04L
    5/023; H04L 5/0064; H04L 27/2614;
    H04L 1/0003; H04L 1/0025; H04L
    5/0007; H04L 5/0042; H04L 5/0044;
    H04L 5/0053; H04L 5/006; H04L
    25/0216; H04L 25/0222; H04L 25/03159;
    H04L 25/03834; H04L 27/2604; H04L
    27/2665; H04L 47/10; H04L 47/14; H04L
    47/26; H04L 47/522; H04L 47/625; H04B
    7/264; H04B 1/0003; H04B 1/406; H04B
    7/2634

USPC ... 455/13.4, 127.1, 127.5, 214, 343.2–343.5,
    455/177.1, 200.1, 260, 266, 434, 450,
    455/452.2, 453, 464, 509, 552.1, 553.1,
    455/574, 115.1, 161.1; 370/118, 208,
    370/297, 311, 312, 316, 335, 337, 342,
    370/395.21, 395.41, 468, 477, 328, 329;
    375/225, 260, 297, 316, 344, 345, 219
  See application file for complete search history.

(56) References Cited

U.S. PATENT DOCUMENTS

| | | | |
|---|---|---|---|
| 6,920,128 B1* | 7/2005 | Haugli | H04B 7/1858 370/321 |
| 2003/0203721 A1* | 10/2003 | Berezdivin | H03M 13/255 455/126 |
| 2005/0259684 A1* | 11/2005 | Csapo | 370/468 |
| 2006/0039333 A1* | 2/2006 | Pirzada et al. | 370/338 |
| 2006/0084460 A1 | 4/2006 | Matsuo et al. | |
| 2007/0218942 A1* | 9/2007 | Khan et al. | 455/553.1 |
| 2008/0026718 A1* | 1/2008 | Wangard et al. | 455/266 |
| 2008/0117881 A1 | 5/2008 | Golitschek Edler von Elbwart et al. | |
| 2008/0212527 A1* | 9/2008 | Hosein et al. | 370/329 |
| 2008/0273614 A1* | 11/2008 | Heegard | H04L 27/34 375/260 |
| 2009/0067355 A1* | 3/2009 | Haartsen et al. | 370/311 |
| 2009/0068969 A1 | 3/2009 | Lindoff et al. | |
| 2009/0069057 A1* | 3/2009 | Haartsen et al. | 455/574 |
| 2009/0124233 A1 | 5/2009 | Morris | |
| 2010/0022250 A1* | 1/2010 | Petrovic et al. | 455/450 |
| 2010/0322158 A1* | 12/2010 | Lee | H04L 5/001 370/329 |

FOREIGN PATENT DOCUMENTS

| | | |
|---|---|---|
| EP | 1909520 A1 | 4/2008 |
| JP | 2002044725 A | 2/2002 |
| JP | 2008099318 A | 4/2008 |
| WO | WO 2008040447 A1 * | 4/2008 |
| WO | 2009/034089 A1 | 3/2009 |

* cited by examiner

POWER EFFICIENT DATA TRANSMISSION

RELATED APPLICATIONS

This application claims priority under 35 U.S.C. §119(e) from the U.S. Provisional Patent Application with Ser. No. 61/222,240, filed on 1 Jul. 2009, and entitled "Power-Aware UE Scheduling."

TECHNICAL FIELD

The present invention generally relates to bandwidth selection for data transmissions between a mobile node and a network node in a wireless communication system, and particularly relates to bandwidth selection for transmitting data efficiently in terms of the power consumed by the mobile node.

BACKGROUND

The 3rd Generation Partnership Project (3GPP) is currently developing specifications for forthcoming wireless communication systems, including Long Term Evolution (LTE) systems and LTE-Advanced systems. These systems will support a wide range of transmission bandwidths. 3GPP specifications for LTE systems, for example, define transmission bandwidths ranging from approximately 1 MHz to 20 MHz over a single LTE carrier. Likewise, 3GPP specifications for LTE-Advanced systems define transmission bandwidths up to 100 MHz through aggregation of up to five 20 MHz LTE component carriers.

Support of such large transmission bandwidths enables increased data rates and higher system throughput. In fact, current scheduling strategies suggest scheduling data transmissions with large bandwidths, along with higher order modulation, spatial multiplexing, and so on, in order to maximize system throughput (or at least in order to maximize system throughput while also meeting some fairness criterion). Maximum system throughput, however, will not generally coincide with maximum power efficiency at the mobile node. That is, current scheduling strategies maximize system throughput, but at the expense of increased energy consumption by the mobile node per data unit received.

SUMMARY

Methods and apparatus taught herein advantageously schedule a data transmission in a variable bandwidth wireless communication system based on the power efficiency of a mobile node. Instead of scheduling the data transmission to maximize system throughput, the methods and apparatus schedule the data transmission according to a target power efficiency setting for the mobile node.

In one embodiment, for example, the mobile node is pre-configured to operate at the maximum power efficiency that can be attained without the data rate of the data transmission falling below a minimum data rate required by a quality of service. In such embodiments, the mobile node requests that resources be allocated for the data transmission to maximize the power efficiency of the mobile node rather than to maximize the data rate. Of course, in some wireless communication systems, the system is not required to comply with the mobile node's request (e.g., in order to conserve system capacity); the pre-configuration of the mobile node, therefore, can be understood in some embodiments as a desired or targeted power efficiency of the mobile node. Of course, while in the above example the mobile node was pre-configured to operate at the maximum power efficiency possible, the mobile node may be pre-configured in other embodiments to operate at some intermediate power efficiency that better balances power efficiency and throughput.

In still other embodiments, the power efficiency configuration of the mobile node is dynamically set by a user of the mobile node rather than being pre-configured in the mobile node. For example, the user may select the power efficiency configuration from several pre-defined configurations (e.g., maximum power efficiency, maximum data rate, etc.), such that the user can dynamically adjust whether the mobile node operates at the maximum power efficiency possible, the maximum data rate possible, or some intermediate power efficiency.

Regardless, the mobile node in one embodiment stores a power efficiency model that models the power efficiency of the mobile node's receiver for different possible bandwidths of a data transmission to the mobile node (i.e., a downlink data transmission). The mobile node selects from the different possible bandwidths of the data transmission the bandwidth that supports a given data rate (e.g., a minimum data rate, a current data rate, etc.) and that, according to the power efficiency model, yields a power efficiency comporting with the power efficiency configuration. The mobile node then sends feedback to a network node in the system requesting that the network node schedule the data transmission to the mobile node with the selected bandwidth.

In other embodiments, the mobile node may alternatively or additionally store a power efficiency model that models the power efficiency of the mobile node's transmitter for different possible bandwidths of a data transmission from the mobile node (i.e., an uplink data transmission). The mobile node selects a bandwidth for an uplink data transmission in much the same way as with a downlink data transmission, except in some embodiments separate power efficiency configurations may be set for uplink and downlink data transmissions. That is, in some embodiments, a user may separately specify power efficiency configurations for data transmissions in the downlink and uplink directions.

In still other embodiments, the network node stores the power efficiency model rather than the mobile node. In this case, the network node stores a power efficiency model for multiple mobile nodes, or multiple groups of mobile nodes. The network node then selects a bandwidth for a data transmission to or from a certain mobile node in much the same way as that described above, based on the power efficiency model for that mobile node, or for a group including that mobile node.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
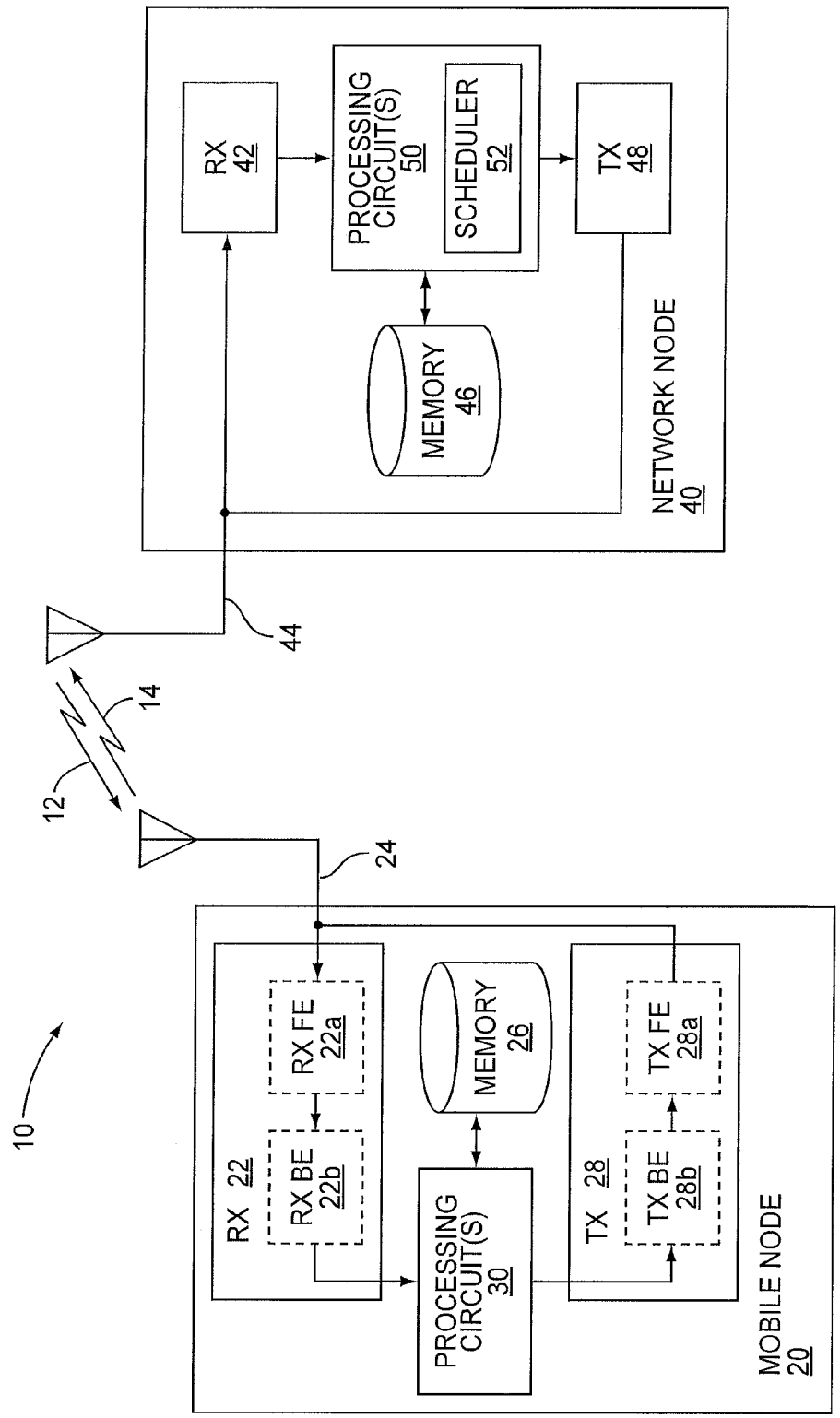
FIG. 1 is a block diagram of a mobile node and a network node in a variable bandwidth wireless communication system according to one embodiment of the present invention.

FIG. 1 illustrates a variable bandwidth wireless communication system 10 for data transmission between a mobile node 20 and a network node 40. Data transmission occurs over one or more downlink carriers 12, or over one or more uplink carriers 14, depending on whether the data transmission takes place in the downlink direction (i.e., from the network node 40 to the mobile node 20) or in the uplink direction (i.e., from the mobile node 20 to the network node 40). In either case, the overall bandwidth occupied by the one or more carriers 12, 14, and thereby the bandwidth of the data transmission, may be varied as scheduled by the network node 40.

In one embodiment, for example, the variable bandwidth wireless communication system 10 comprises an LTE system. The network node 40 as part of an LTE system may schedule the data transmission to occur over a single LTE carrier that occupies a channel bandwidth somewhere between 1.4 MHz and 20 MHz (current LTE standards permit either a 1.4 MHz carrier, a 3 MHz carrier, a 5 MHz carrier, a 10 MHz carrier, a 15 MHz carrier, or a 20 MHz carrier). In another embodiment, the system 10 comprises an LTE-Advanced system. The network node 40 as part of an LTE-Advanced system may schedule the data transmission to occur over anywhere between one and five LTE component carriers which, in the aggregate, occupy a bandwidth that may be up to 100 MHz, e.g., depending on the number of LTE component carriers scheduled for the data transmission.

Although the network node 40 actually schedules the data transmission's bandwidth as described above, the network node 40 does so in accordance with a request or recommendation from the mobile node 20. The amount of weight the network node 40 must give to the mobile node's request may depend on the configuration and/or type of the system 10. In one embodiment, for example, the mobile node 20 selects a bandwidth for a future data transmission from different possible bandwidths and sends feedback to the network node 40 requesting that the network node 40 schedule the data transmission with that bandwidth. The network node 40 can then schedule the data transmission's bandwidth based on the mobile node's request, but may not be required to comply with that request e.g., in order to conserve the capacity of the system 10. Regardless, according to one embodiment of the present invention, the mobile node 20 selects the bandwidth to request for the data transmission based on the mobile node's power efficiency.

Take for instance data transmissions sent from the network node 40 to the mobile node 20. A receiver 22 in the mobile node 20, via the one or more antennas 24, receives these data transmissions from the network node 40 over the one or more downlink carriers 12. In doing so, the receiver 22 consumes power. The amount of power that the receiver 22 consumes relative to the rate of data that the receiver 22 receives defines the power efficiency of the mobile node 20. Accordingly, the less power that the mobile node 20 consumes while receiving data at a given rate, the more power efficient the mobile node 20.

The power consumption, data rate, and thereby the power efficiency of the mobile node 20, depend on the bandwidth of a received data transmission. In some circumstances, the mobile node 20 can select the bandwidth of a data transmission so as to reduce the power consumed by the mobile node 20 in receiving that data transmission, while also maintaining a given data rate. This increases the power efficiency of the mobile node 20 without compromising the data rate. In order to increase the power efficiency of the mobile node 20 in other circumstances, however, such as when the system 10 is highly loaded, the mobile node 20 must select the bandwidth of the data transmission so as to decrease the transmission's data rate. The data rate, of course, may only be decreased to a certain extent in some situations, such as when a quality of service associated with the data transmission requires at least a minimum data rate.

A power efficiency configuration of the mobile node 20 controls the selection of transmission bandwidth in these circumstances. In one embodiment, for example, the mobile node 20 is pre-configured to operate at the maximum power efficiency possible without the data rate falling below a minimum data rate required by a quality of service. In other embodiments, the mobile node's power efficiency configuration is instead dynamically set by the user of the mobile node 20, e.g., based on whether that user prefers greater power efficiency (i.e., longer battery life of the mobile node 20) or higher data rate when circumstances prevent both from being attained simultaneously. The user may, for instance, set the power efficiency configuration by selecting the configuration from a plurality of pre-defined power efficiency configurations displayed to the user. One pre-defined configuration may include a maximum power efficiency configuration similar to that discussed above. Another pre-defined configuration may include a maximum data rate configuration that controls the mobile node 20 to operate at the maximum data rate possible irrespective of the power efficiency of the mobile node. Other pre-defined configurations may include one or more configurations intermediate to maximum power efficiency and maximum data rate (e.g., a "greedy" configuration that controls the mobile node 20 to operate at the highest power efficiency that doesn't require compromising the current data rate of the data transmission, where the current data rate is greater than the minimum rate required for the quality of service). Accordingly, irrespective of how the power efficiency configuration of the mobile node 20 is set, whether by pre-configuration or by user selection, the mobile node 20 selects the bandwidth of a data transmission to support a given data rate (e.g., a minimum data rate, a current data rate, etc.) and to yield a power efficiency comporting with the power efficiency configuration.

Figure 2:
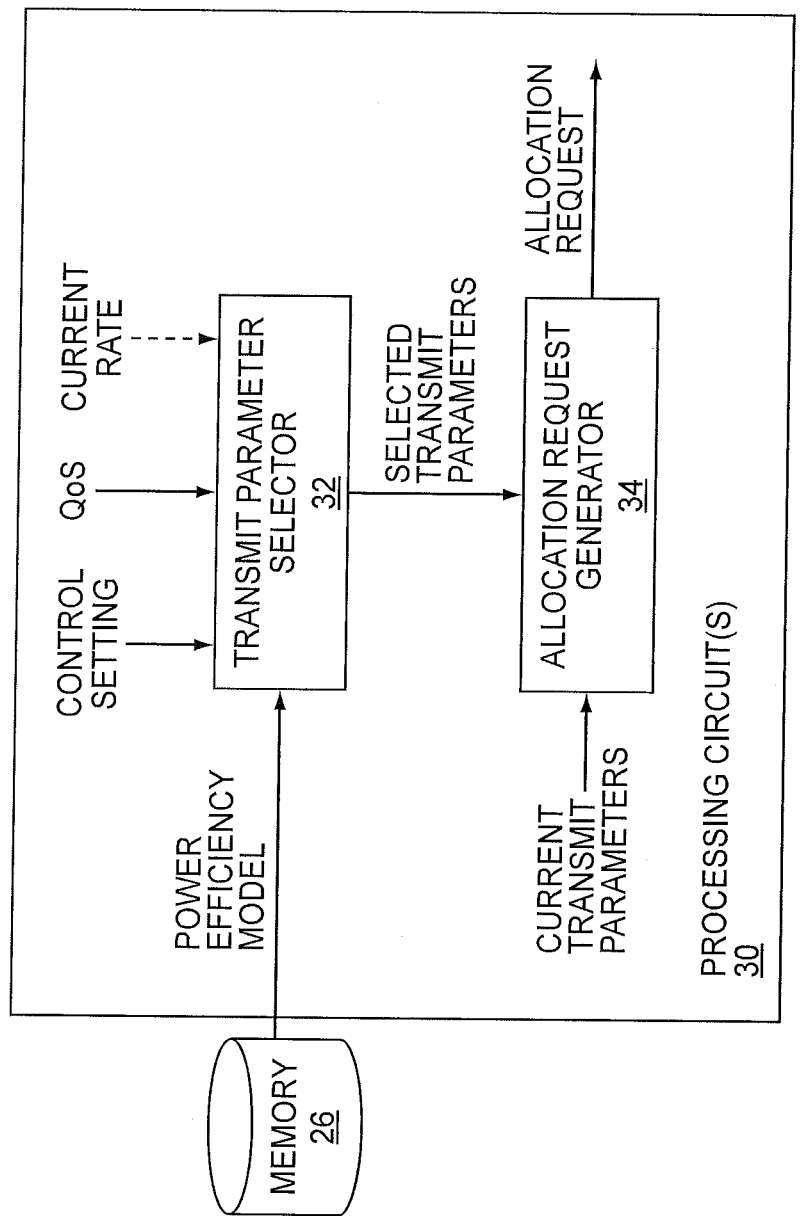
FIG. 2 is a block diagram of processing circuit(s) within a mobile node according to one embodiment of the present invention.

One or more processing circuits 30 of the mobile node 20 perform this selection in conjunction with memory 26. FIG. 2 illustrates one example of such processing circuit(s) 30 and memory 26. In FIG. 2, memory 26 stores a power efficiency model that models the power efficiency of the mobile node 20 for different possible bandwidths of a data transmission. The model may, for instance, be a look-up table stored in memory 26 which maps the different possible bandwidths to the power efficiency each bandwidth yields. The one or more processing circuits 30 include a transmit parameter selector 32 that accepts as input this power efficiency model, as well as the value of a control setting that defines a power efficiency configuration of the mobile node 20, one or more quality of service (QoS) parameters such as a minimum data rate required for that QoS, and in some embodiments the current data rate. The transmit parameter selector 32 selects from the different possible bandwidths of the data transmission a bandwidth that supports a given data rate and that, according to the power efficiency model, yields a power efficiency comporting with the power efficiency configuration.

For example, if the control setting defines a maximum power efficiency configuration, then the transmit parameter selector 32 selects, from those possible bandwidths that support the minimum data rate required for the indicated QoS, the bandwidth that yields the highest power efficiency. On the other hand, if the control setting defines a greedy configuration, then the transmit parameter selector 32 selects, from those possible bandwidths that support the current data rate, the bandwidth that yields the highest power efficiency. As a final example, if the control setting defines a maximum data rate configuration, then the transmit parameter selector 32 selects, from all possible bandwidths, the bandwidth that supports the highest data rate irrespective of the power efficiency of the mobile node 20.

Having selected the bandwidth of the data transmission, the one or more processing circuits 30 generate a request for the network node 40 to schedule the data transmission with that bandwidth. Specifically, the one or more processing circuits 30 in the example of FIG. 2 include an allocation request generator 34 that accepts as input the selected bandwidth and the current bandwidth (e.g., the bandwidth of the most recently received data transmission). The allocation request generator 34 compares the selected bandwidth with the current bandwidth and generates an allocation request based on that comparison. If the current bandwidth is less than the selected bandwidth, the allocation request requests the network node 40 for an increase in bandwidth allocation. Likewise, if the current bandwidth is greater than the selected bandwidth, the allocation request requests the network node 40 for a decrease in bandwidth allocation. Finally, if the current bandwidth is the same as the selected bandwidth, the allocation request requests the network node 40 to maintain the bandwidth allocation.

The allocation request generator 34, in one embodiment, generates the allocation request as a 2-bit field on a control channel. A value of '00', for instance, may indicate a request to maintain the bandwidth allocation; '01' to decrease the bandwidth allocation; '10' to increase the bandwidth allocation; and '11' to indicate no preference. In other embodiments, the allocation request generator 34 generates the allocation request as a more detailed request, which indicates not only the direction of change requested in the bandwidth allocation but also the amount of that change (e.g., based on the actual difference between the selected bandwidth and the current bandwidth). Of course, while the above embodiment has illustrated the allocation request as a request formed based on a comparison with the current bandwidth, this is not required. Indeed, the allocation request may simply include an indication of the selected bandwidth.

Once the processing circuit(s) 30 generate the allocation request, a transmitter 28 included in the mobile node 20 transmits the request to the network node 40 via the one or more antennas 24. In one embodiment, the transmitter 28 is configured to transmit the allocation request over an uplink physical control channel. In another embodiment, the transmitter 28 is configured to transmit the allocation request using Radio Resource Control (RRC) messaging. Regardless, the transmitter 28 may be configured to transmit the allocation request based on certain timing requirements. In one embodiment, for instance, the transmitter 28 is configured to transmit a request at a certain time (e.g., every few seconds), which may or may not be aligned in time with the transmission of allocation requests by other mobile nodes in the system 10. In another embodiment, the transmitter 28 is configured to transmit a request with timing that depends on the type of the request. For instance, the transmitter 28 may be configured to transmit requests for bandwidth allocations that increase the data rate of data transmissions as soon as possible, while transmitting requests for bandwidth allocations that increase the power efficiency of the mobile node 20 with less urgency.

A receiver 42 in the network node 40 receives the allocation request via one or more antennas 44 and provides the request to one or more processing circuits 50. A scheduler 52 included in the one or more processing circuits 50 schedules the data transmission in accordance with the allocation request, whereupon transmitter 48 transmits the data transmission over the one or more downlink carriers 12. As described above, the amount of weight the scheduler 52 must give to the mobile node's request may depend on the configuration and/or type of the system 10. In one embodiment, however, such as when the system 10 comprises an LTE system, the scheduler 52 can, but is not required to, schedule the data transmission with the bandwidth requested by the mobile node 20. If the system 10 is nearing its capacity, for instance, the scheduler 52 may decline the mobile node's request if that request is for an increased bandwidth allocation. Because the mobile node's request may be declined in such embodiments, the power efficiency configuration of the mobile node can be understood in this case as a desired or targeted power efficiency of the mobile node.

In the above embodiments, the mobile node 20 selects the bandwidth to request for a data transmission sent in the downlink direction, based on the power efficiency of its receiver 22. In much the same way, the mobile node 20 may alternatively or additionally select the bandwidth to request for a data transmission sent in the uplink direction, based on the power efficiency of its transmitter 28. That is, the power efficiency of the mobile node 20 may also be understood in terms of the amount of power that the transmitter 28 consumes, when transmitting a data transmission in the uplink direction, relative to the rate of data that the transmitter 28 transmits. Similar to the receiver 22, then, the less power that the transmitter 28 consumes while transmitting data at a given rate, the more power efficient the mobile node 20.

In embodiments where the mobile node 20 selects the bandwidth for data transmissions in both the downlink and uplink directions, the memory 26 stores different power efficiency models that model the power efficiency of the mobile node's receiver 22 and transmitter 28, respectively, for the different possible bandwidths. When selecting the bandwidth for data transmission in the downlink direction, the one or more processing circuits 30 select the bandwidth according to the power efficiency model that models the power efficiency of the mobile node's receiver 22. Likewise, when selecting the bandwidth for data transmission in the uplink direction, the one or more processing circuits 30 select the bandwidth according to the power efficiency model that models the power efficiency of the mobile node's transmitter 28

Furthermore, in some embodiments, a single power efficiency configuration of the mobile node 20 controls the mobile node's selection of transmission bandwidth for both the uplink and downlink directions. In other embodiments, the mobile node 20 has separate power efficiency configurations specified for the uplink and downlink directions. For example, in embodiments where the power efficiency configuration is set by the user of the mobile node 20, that user may set the mobile node 20 to operate at maximum power efficiency in the uplink direction but at maximum data rate in the downlink direction (or vice versa).

Also described in the above embodiments, the mobile node 20 is the node that stores the power efficiency model and selects the transmission bandwidth according to that model. Because different mobile nodes may have different power efficiencies even for the same respective transmission bandwidths, storing a power efficiency model within each mobile node 20 allows the model to describe the potentially unique power efficiency characteristics of that mobile node. Storing the power efficiency model in the mobile node 20 also insulates the network node 40 from the details of the underlying bandwidth allocation requests.

Figure 3:
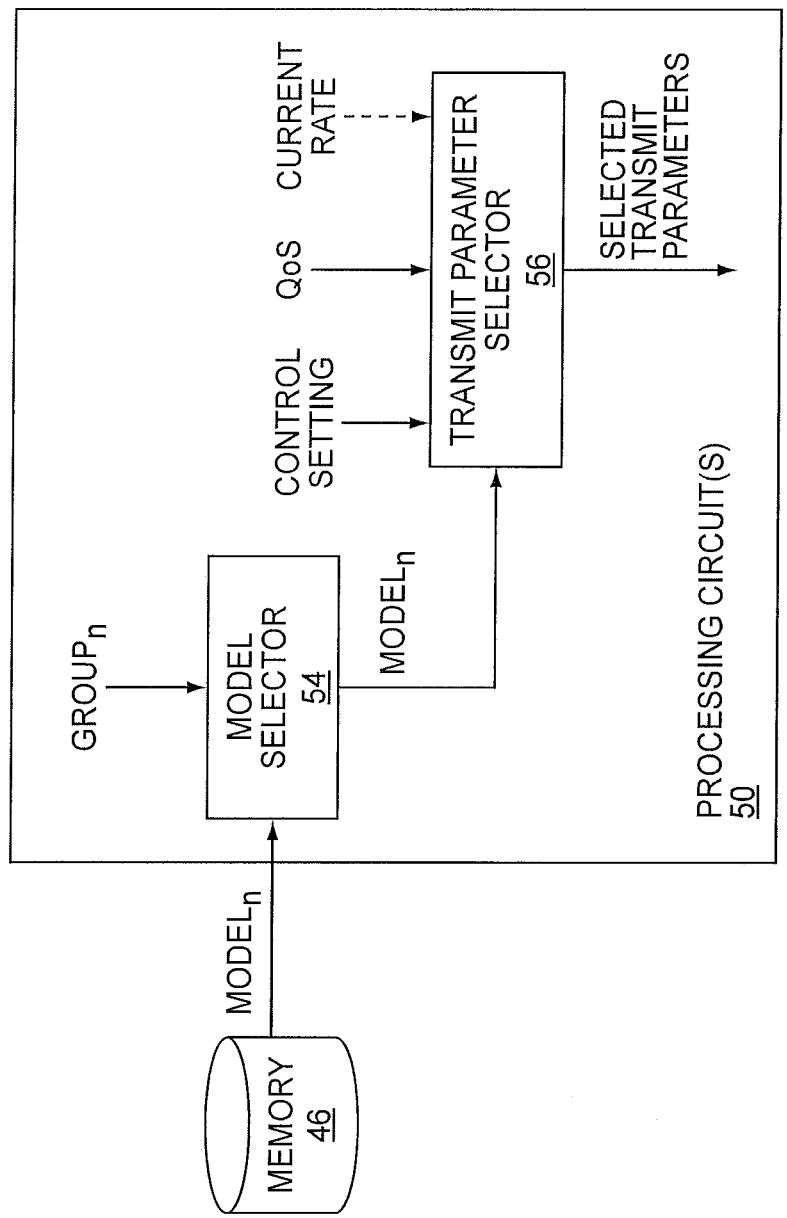
FIG. 3 is a block diagram of processing circuit(s) within a network node according to one embodiment of the present invention.

In other embodiments, however, the network node 40 may be the node that stores the power efficiency model and that selects the transmission bandwidth according to that model e.g., as part of the scheduling process itself. FIG. 3 illustrates one example of the processing circuit(s) 50 configured in this way. In FIG. 3, memory 46 included in the network node 40 stores N power efficiency models, one for each of N groups of mobile nodes served by the network node 40. In order to select the bandwidth for a data transmission to a certain mobile node 20, a model selector 54 selects the power efficiency model for the group that includes the mobile node 20 and provides that model to a transmit parameter selector 56. The transmit parameter selector 56 is configured to select the bandwidth of the data transmission based on the provided model in much the same way as described above with respect to the transmit parameter 32 in FIG. 2, whereupon the scheduler 52 schedules the data transmission with the selected bandwidth. Note that in an embodiment where the control setting defines a power efficiency configuration set by the user of the mobile node 20, the network node 40 receives an indication of the selected power efficiency configuration from the mobile node 20.

Note also that while the memory 46 in the above embodiment stored a power efficiency model for different groups of mobile nodes, the memory 46 may alternatively store a power efficiency model for each individual mobile node. Furthermore, the network node 40 may select the bandwidth for data transmissions in the uplink direction, the downlink direction, or both in much the same way as that described above with respect to the mobile node 20.

Figure 4:
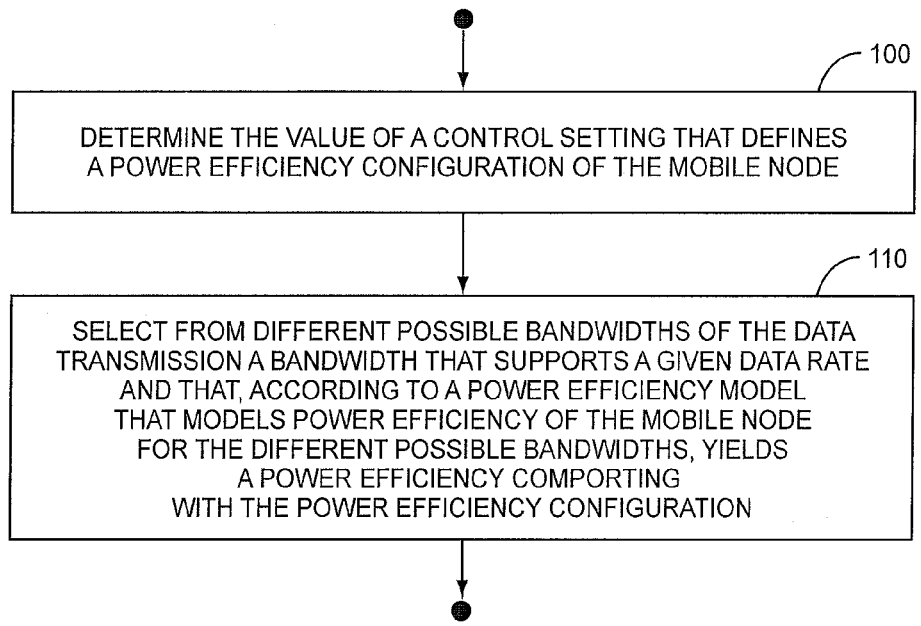
FIG. 4 is a logical flow diagram illustrating a method for transmitting data between a mobile node and a network node efficiently in terms of power consumed by the mobile node, according to one embodiment of the present invention.

With the above variations and modifications in mind, those skilled in the art will appreciate that the one or more processing circuits 30 of the mobile node 20, or alternatively the one or more processing circuits 50 of the network node 40, generally perform the method illustrated in FIG. 4 to select the bandwidth for a data transmission (in either the uplink or downlink direction). In FIG. 4, the one or more processing circuits 30, 50 determine the value of a control setting that defines a power efficiency configuration of the mobile node 20 (Block 100). The one or more processing circuits 30, 50 then select from different possible bandwidths of the data transmission a bandwidth that supports a given data rate and that, according to a power efficiency model that models power efficiency of the mobile node for the different possible bandwidths, yields a power efficiency comporting with the power efficiency configuration (Block 110).

It should be noted that the power efficiency of the mobile node 20 may also depend on transmit parameters other than just the bandwidth of a data transmission. The power efficiency may depend on, for instance, the bandwidth of a data transmission in conjunction with the modulation format, coding scheme, multi-antenna technique, discontinuous reception (DRX) or discontinuous transmission (DTX) timing, allocation of data within the time-frequency domain of a carrier, or other such transmit parameters. Thus, selection of the bandwidth of a data transmission may, in some embodiments, entail selecting from different possible combinations of two or more transmit parameters, including the bandwidth, the combination that supports a given data rate and that yields a power efficiency comporting with the power efficiency configuration. A power efficiency model is also used for the selection of the combination in much the same way as the above embodiments, and may model the power efficiency of the mobile node 20 for the different possible combinations.

In one embodiment, for instance, the bandwidth of a data transmission is selected by selecting a combination of transmit parameters that includes the bandwidth and the modulation and coding scheme of the data transmission. As the modulation and coding scheme of the data transmission is associated with a minimum signal-to-noise ratio (SNR) required for receiving a data transmission transmitted with that scheme at or below a specified block-error rate (BLER) or equivalent measure, the power efficiency model may model the power efficiency of the mobile node 20 in terms of different possible combinations of transmission bandwidth and SNR. (Accordingly, the discussion below explains various examples in terms of a combination of bandwidth and SNR requirement merely for illustrative purposes; however, those skilled in the art will appreciate that such refers to a combination of a bandwidth and a modulation and coding scheme that is associated with a certain SNR requirement).

Assume, for example, that the power efficiency model of the mobile node's receiver 22 comprises a ratio of the rate $R_r$ of a data transmission received to the power consumed $P_r$ by the receiver 22:

$$RPR = \frac{R_r}{P_r} \quad (1)$$

where RPR is the rate-power ratio of the receiver 22. Both the data rate $R_r$ and the power consumption of the receiver, $P_r$, can be expressed in terms of the transmission bandwidth, BW, and SNR as described below.

For instance, assume that the receiver 22 can be modeled as a receiver front-end (RX FE) 22a and a receiver back-end (RX BE) 22b. The RX FE 22a as modeled in this example includes a low-noise power amplifier, a down-conversion mixer, a local oscillator frequency synthesizer, and other components having power consumption properties that are assumed not to depend on BW or SNR. The RX BE 22b as modeled includes a channel filter, an analog-to-digital converter, and other components having power consumption properties that are assumed to linearly depend on BW and SNR. Based on these simplified assumptions, the power consumption of the receiver, $P_r$, can be expressed as:

$$P_r = P_{FE} + P_{BE} \cdot BW \cdot SNR \quad (2)$$

where $P_{FE}$ (Watts) is the power consumed by the RX FE 22a and $P_{BE}$ (Watts/Hz) is the power consumed, per Hz and SNR unit, by the RX BE 22b. Likewise, assume the data rate $R_r$ can be modeled as:

$$R_r = \eta \cdot BW \cdot \log_2(1 + SNR) \approx \eta \cdot BW \cdot \log_2(SNR) \quad (3)$$

where η is a coefficient and the approximation holds for SNR>>1. Combining equations (1), (2), and (3), the power efficiency of the receiver 22, modeled as RPR in terms of BW and SNR, includes:

$$RPR = \frac{\eta \cdot BW \cdot \log_2(SNR)}{P_{FE} + P_{BE} \cdot BW \cdot SNR} \qquad (4)$$

where RPR is in terms of bits per Joule.

Figure 5:
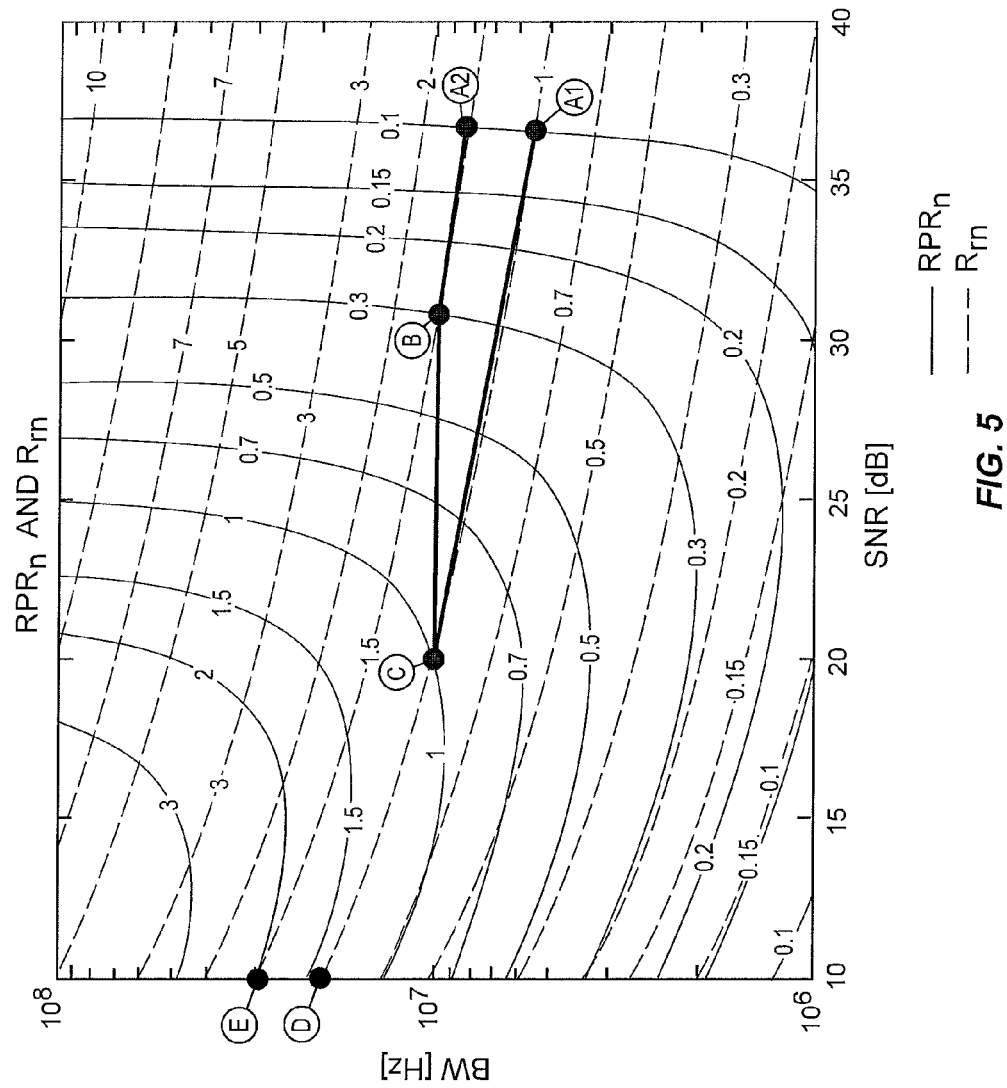
FIG. 5 is one example of a plot of mobile node power efficiency and transmission data rate as a function of transmission bandwidth and required signal-to-noise ratio.

FIG. 5 illustrates a plot of RPR and $R_r$, normalized for different combinations of BW (swept continuously from 1 MHz to 100 MHz) and SNR (swept continuously from 10 dB to 40 dB). While FIG. 5 shows RPR and $R_r$ for continuous sweeps of BW and SNR, in practice the range of available BW and SNR, and thus the combinations thereof, will be discrete. Nonetheless, in FIG. 5, RPR has been normalized as $RPR_n$:

$$RPR_n = \frac{RPR}{RPR_0} = \frac{R_r/P_r}{R_0/P_0} = \frac{R_r/R_0}{P_r/P_0} = \frac{R_m}{P_m} \qquad (5)$$

where $P_0=P_{FE}+P_{BE} \cdot BW_0 \cdot SNR_0$ and $R_0=\eta \cdot BW_0 \cdot \log_2(SNR_0) \cdot \eta$ is a constant with unit bits/Hz, indicating the spectral efficiency of the transmission configuration. Furthermore, this example assumes the following values: $BW_0=10$ MHz, $SNR_0=100$ (20 dB), $P_{FE}=50$ mW, and $P_{BE}=30$ mW/$BW_0$/$SNR_0$.

Consider an example whereby a mobile node is operating at point A1 in FIG. 5. At point A1, the mobile node receives a data transmission with a bandwidth of approximately 8 MHz and with an SNR requirement of approximately 37 dB. With this combination of transmit parameters, the mobile node receives data at a normalized data rate of $R_m=1$ and with a normalized power efficiency of $RPR_n=0.1$. Assume for this example that the minimum data rate required for a quality of service associated with the mobile node's data transmission is indeed 1 bit/s, so that the mobile node cannot decrease its data rate (at least not without also maintaining its quality of service). Also assume that the mobile node is configured with a maximum power efficiency configuration; that is to operate at the maximum power efficiency possible without the normalized data rate falling below 1.

With these assumptions, one notices from the plot that the mobile node can increase its normalized power efficiency $RPR_n$ without having to decrease its normalized data rate $R_m$ below 1 if the data transmission's bandwidth BW is increased and its SNR requirement is lowered. In fact, of the possible combinations of bandwidth BW and SNR requirement that don't require the mobile node to decrease its normalized data rate $R_m$ below 1, the combination of BW and SNR requirement marked at point D (~20 MHz and 10 dB) yields the highest power efficiency ($RPR_n \approx 1.5$). Accordingly, the mobile node selects the combination at point D, compares it to the current combination at point A1, and sends a request to the network node 40 to increase the bandwidth BW and to lower the SNR requirement (e.g., by altering the coding scheme and lowering the order of the modulation). This process continues for one or more allocation request time intervals, such that the combination of the mobile node's transmit parameters moves along the $R_m=1$ line from point A1 towards point D.

Assume in this example, however, that the network node 40 declines the mobile node's request for an increase in bandwidth BW at point C (~10 MHz), e.g., because the system 10 is nearing its capacity. As the mobile node is already receiving the data transmission at the minimum data rate required by the quality of service, that is $R_m=1$, the mobile node has reached the maximum power efficiency permitted by the quality of service (and the system 10).

Now consider the case if the mobile node had begun operating at point A2 instead of at A1. Operating at point A2, the mobile node receives data at a normalized data rate of $R_m=1.5$, which is above the minimum data rate of $R_m=1$ required for the quality of service. In one embodiment, therefore, the mobile node initially selects the combination of BW and SNR requirement at point E, in an attempt to increase the normalized power efficiency $RPR_n$ without having to compromise the normalized data rate $R_m=1.5$. This, of course, may be successful in moving the mobile node from point A2 to point B (~10 MHz), whereupon the network node 40 declines the mobile node's request for an increase in bandwidth BW.

If the mobile node had been configured with a "greedy" configuration, which attempts to reach the highest power efficiency without having to compromise the current data rate, the mobile node would have reached the highest power efficiency permitted by that configuration. However, in this example, the mobile node is configured with a maximum power efficiency configuration, where the data rate can be decreased to the minimum data rate required for the quality of service in order to achieve a higher power efficiency. Accordingly, the mobile node now selects the combination at point C, which is the combination that yields the highest power efficiency given (1) the maximum bandwidth allocation allowed by the network node 40; and (2) the minimum data rate required for the quality of service. Comparing the selected combination at point C to the current combination at point B, the mobile node sends a request to the network node 40 to maintain the bandwidth allocation and to lower the SNR requirement. This process continues for one or more allocation request time intervals, such that the combination of the mobile node's transmit parameters moves along the line from point B towards point C. At point C, the mobile node has reached the maximum power efficiency permitted by the quality of service (and the system 10).

Note that the above example was based on the assumption that the power efficiency model did not restrict the possible bandwidths that could be selected for the data transmission in order to conserve the capacity of the system 10. That is, because the model did not restrict the possible bandwidths to those at or below 10 MHz, the mobile node in the example initially selected point E (a point that does not take into account the capacity of the system). However, in some embodiments, the power efficiency model may indeed restrict the possible bandwidths that can be selected for the data transmission in order to conserve the capacity of the system 10. In the example, then, the model would have restricted the possible bandwidths to those at or below 10 MHz, so that the mobile node may have initially selected point C instead.

Furthermore, the above example described a power efficiency model of the mobile node's receiver 22 as a way of demonstrating selection of bandwidth for a data transmission sent in the downlink direction. However, a power efficiency model of the mobile node's transmitter 28 may be described in much the same way, to demonstrate selection of bandwidth for a data transmission sent in the uplink direction. For instance, the mobile node's transmitter 28 can likewise be modeled as a transmitter front-end (TX FE) 28a and a transmitter back-end (TX BE) 28b. Accordingly, the power consumption of the transmitter, $P_t$, can be expressed using equations similar to those described above with respect to the power consumption of the receiver, $P_r$. Those skilled in the art will appreciate, therefore, that the preceding description is merely illustrative and not limited to the mobile node's receiver 22.

Moreover, much of the preceding discussion assumes that the mobile node 20 includes only one receiver and/or transmitter chain. If MIMO is employed, several of the functional blocks illustrated in FIG. 1 may be duplicated for each receiver and/or transmitter. Thus, the particular MIMO scheme employed may have a dramatic effect on the power efficiency of the mobile node 20. To the extent that the MIMO scheme may be varied over time, the parameters defining the MIMO scheme, such as parameters defining precoding schemes, spatial multiplexing schemes, and/or diversity coding schemes, will also affect the power efficiency of the mobile node 20. As discussed above, the power efficiency model may model the power efficiency of the mobile node 20 for different combinations of these transmit parameters, and select a combination that yields a power efficiency comporting with the power efficiency configuration.

Those skilled in the art will appreciate that the various "circuits" described may refer to a combination of analog and digital circuits, including one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Moreover, while described above with reference to LTE systems and LTE-Advanced systems, the present invention is not so limited. Indeed, the system 10 may comprise a CDMA2000-based system, an HDR-based system, an HSPA-based system, or the like. Furthermore, those skilled in the art will appreciate that the term network node as used herein refers to a base station, Node B, e-Node B, or other node in the system 10 that provides radio communication for mobile nodes. Finally, those skilled in the art will appreciate that the term mobile node as used herein refers to cellular telephones or other types of mobile stations, such as wireless pagers, Portable Digital Assistants, laptop/palmtop computer and/or wireless add-in cards for such computers, or the like. The term "node" by itself may refer to either the network node or the mobile node.

With these and other variations and extensions in mind, those skilled in the art will appreciate that the foregoing description and the accompanying drawings represent non-limiting examples of the methods and apparatus taught herein for determining transmit parameters for a data transmission by a mobile station in a wireless communications system. As such, the present invention is not limited by the foregoing description and accompanying drawings. Instead, the present invention is limited only by the following claims and their legal equivalents.

What is claimed is:

1. A method implemented by a mobile node or a network node in a variable bandwidth wireless communication system for communicating data between the mobile node and the network node efficiently in terms of the power consumed by the mobile node relative to the data rate, wherein the variable bandwidth wireless communication system supports different transmission bandwidths within which allocations for individual mobile nodes are possible, the method comprising:
    determining the value of a control setting, different values of the control setting corresponding to different predefined power efficiency configurations for the mobile node, each power efficiency configuration representing a different tradeoff between power efficiency of the mobile node and data rate;
    selecting from the different transmission bandwidths a transmission bandwidth that, according to a power efficiency model that models power efficiency of the mobile node for the different transmission bandwidths, yields a tradeoff between power efficiency and data rate comporting with the power efficiency configuration corresponding to the determined value, wherein each of the different transmission bandwidths is either a carrier bandwidth or an aggregated carrier bandwidth; and
    transmitting or receiving data between the mobile node and the network node within an allocation from the selected transmission bandwidth.

2. The method of claim 1, wherein determining the value of a control setting comprises determining the value of input received from a user of the mobile node.

3. The method of claim 1, wherein said value corresponds to a maximum power efficiency configuration whereby the mobile node operates at the maximum power efficiency possible without the data rate falling below a minimum data rate required by a quality of service associated with the data transmission, and wherein selecting said transmission bandwidth comprises selecting, from the different transmission bandwidths that support at least said minimum data rate, the transmission bandwidth that yields the maximum power efficiency.

4. The method of claim 1, wherein said value corresponds to a greedy power efficiency configuration whereby the mobile node operates at the maximum power efficiency possible without the data rate falling below a current data rate, wherein the current data rate is greater than a minimum data rate required by a quality of service associated with the data transmission, and wherein selecting said transmission bandwidth comprises selecting, from the different transmission bandwidths that support said current data rate, the transmission bandwidth that yields the maximum power efficiency.

5. The method of claim 1, wherein said power efficiency model restricts the different transmission bandwidths that may be selected for the data transmission to conserve the capacity of the wireless communication system.

6. The method of claim 1, wherein selecting a transmission bandwidth from different transmission bandwidths comprises selecting from different possible combinations of two or more transmit parameters, including the transmission bandwidth, the combination of transmit parameters that yields a power efficiency and data rate comporting with said power efficiency configuration.

7. The method of claim 6, wherein the two or more transmit parameters comprising said different possible combinations further includes a modulation and coding scheme associated with a signal-to-noise ratio required for receiving a data transmission transmitted with that scheme.

8. The method of claim 6, wherein the two or more transmit parameters comprising said different possible combinations further includes a technique for transmitting and/or receiving the data transmission using multiple antennas.

9. The method of claim 1, wherein selecting a transmission bandwidth from different transmission bandwidths comprises selecting a carrier for the data transmission from different possible carriers, at least two of the different possible carriers having different bandwidths.

10. The method of claim 1, wherein the variable bandwidth wireless communication system comprises an LTE-Advanced wireless communication system, and wherein selecting a transmission bandwidth from different transmission bandwidths comprises selecting a number of LTE component carriers for the data transmission.

11. The method of claim 1, wherein the method is implemented by the mobile node, and wherein the method further comprises sending a request to the network node for an allocation of resources for the data transmission based on the selected transmission bandwidth.

12. The method of claim 11, wherein sending a request to the network node for an allocation of resources based on the selected transmission bandwidth comprises sending to the network node a request for an increase or decrease in the transmission bandwidth based on whether the transmission bandwidth of a current data transmission is less than or greater than the selected transmission bandwidth.

13. The method of claim 1, wherein the method is implemented by the network node, and wherein the method further comprising storing a plurality of power efficiency models in memory, each specific to one of a plurality of mobile nodes or to one of a plurality of groups of mobile nodes, and selecting from said plurality of power efficiency models the power efficiency model specific to said mobile node or to the group of mobile nodes including said mobile node.

14. The method of claim 1, wherein determining the value of a control setting comprises determining which of the different pre-defined power efficiency configurations a user of the mobile node selected responsive to the different pre-defined power efficiency configurations being displayed to the user for selection.

15. The method of claim 1, wherein a carrier bandwidth is a bandwidth of an OFDM carrier that comprises multiple subcarriers, an aggregated carrier bandwidth is the bandwidth of the aggregation of multiple OFDM carriers, and an allocation within the selected transmission bandwidth is an allocation within the OFDM carrier or the aggregation of multiple OFDM carriers.

16. The method of claim 1, wherein the value corresponds to a power efficiency configuration whereby the mobile node operates at the maximum power efficiency possible without the data rate falling below a minimum data rate or a current data rate, wherein the current data rate is greater than a minimum data rate which is required by a quality of service associated with the data transmission.

17. One or more processing circuits for use in a mobile node or a network node of a variable bandwidth wireless communication system and for communicating data between the mobile node and the network node efficiently in terms of the power consumed by the mobile node relative to the data rate, wherein the variable bandwidth wireless communication system supports different transmission bandwidths within which allocations for individual mobile nodes are possible, the one or more processing circuits configured to:
determine the value of a control setting, different values of the control setting corresponding to different pre-defined power efficiency configurations for the mobile node, each power efficiency configuration representing a different tradeoff between power efficiency of the mobile node and data rate; and
select from the different transmission bandwidths a transmission bandwidth that, according to a power efficiency model that models power efficiency of the mobile node for the different transmission bandwidths, yields a tradeoff between power efficiency and data rate comporting with the power efficiency configuration corresponding to the determined value, wherein each of the different transmission bandwidths is either a carrier bandwidth or an aggregated carrier bandwidth; and
transmit or receive data between the mobile node and the network node within an allocation from the selected transmission bandwidth.

18. The one or more processing circuits of claim 17, wherein the one or more processing circuits are configured to determine the value of a control setting by determining the value of input received from a user of the mobile node.

19. The one or more processing circuits of claim 17, wherein said value corresponds to a maximum power efficiency configuration whereby the mobile node operates at the maximum power efficiency possible without the data rate falling below a minimum data rate required by a quality of service associated with the data transmission, and the one or more processing circuits are configured to select, from the different transmission bandwidths that support at least said minimum data rate, the transmission bandwidth that yields the maximum power efficiency.

20. The one or more processing circuits of claim 17, wherein said value corresponds to a greedy power efficiency configuration whereby the mobile node operates at the maximum power efficiency possible without the data rate falling below a current data rate, wherein the current data rate is greater than a minimum data rate required by a quality of service associated with the data transmission, and wherein the one or more processing circuits are configured to select, from the different transmission bandwidths that support said current data rate, the transmission bandwidth that yields the maximum power efficiency.

21. The one or more processing circuits of claim 17, wherein said power efficiency model restricts the different transmission bandwidths that may be selected for the data transmission to conserve the capacity of the wireless communication system.

22. The one or more processing circuits of claim 17, wherein the one or more processing circuits are configured to select a transmission bandwidth from the different transmission bandwidths by selecting from different possible combinations of two or more transmit parameters, including the transmission bandwidth, the combination of transmit parameters that yields a tradeoff between power efficiency and data rate comporting with said power efficiency configuration.

23. The one or more processing circuits of claim 22, wherein the two or more transmit parameters comprising said different possible combinations further includes a modulation and coding scheme associated with a signal-to-noise ratio required for receiving a data transmission transmitted with that scheme.

24. The one or more processing circuits of claim 22, wherein the two or more transmit parameters comprising said different possible combinations further includes a technique for transmitting and/or receiving the data transmission using multiple antennas.

25. The one or more processing circuits of claim 17, wherein the one or more processing circuits are configured to select a transmission bandwidth from the different transmission bandwidths by selecting a carrier for the data transmission from different possible carriers, at least two of the different possible carriers having different bandwidths.

26. The one or more processing circuits of claim 17, wherein the variable bandwidth wireless communication system comprises an LTE-Advanced wireless communication system, and wherein the one or more processing circuits are configured to select a transmission bandwidth from the different transmission bandwidths by selecting a number of LTE component carriers for the data transmission.

27. A mobile node including the one or more processing circuits of claim 17, wherein the one or more processing circuits are further configured to send a request to the network node for an allocation of resources based on the selected transmission bandwidth.

28. The mobile node of claim 27, wherein the one or more processing circuits are configured to send a request to the network node for an allocation of resources based on the selected transmission bandwidth by sending to the network node a request for an increase or decrease in the transmission bandwidth based on whether the transmission bandwidth of a current data transmission is less than or greater than the selected transmission bandwidth.

29. A network node including the one or more processing circuits of claim 17, wherein the network node further includes a memory configured to store a plurality of power efficiency models, each specific to one of a plurality of mobile nodes or to one of a plurality of groups of mobile nodes, and wherein the one or more processing circuits are configured to select from said plurality of power efficiency models the power efficiency model specific to said mobile node or to the group of mobile nodes including said mobile node.

\* \* \* \* \*